United States Patent [19]

Cronin

[11] Patent Number: 4,587,436

[45] Date of Patent: May 6, 1986

[54] AIRCRAFT PROVIDING VARIABLE AND CONSTANT ELECTRIC POWER

[75] Inventor: Michael J. Cronin, Sherman Oaks, Calif.

[73] Assignee: Lockheed Corporation, Burbank, Calif.

[21] Appl. No.: 173,111

[22] Filed: Jul. 28, 1980

[51] Int. Cl.⁴ ................................................ H02J 3/14
[52] U.S. Cl. .......................................... 307/21; 307/9; 322/8
[58] Field of Search .................... 307/9, 10 R, 84, 25, 307/26, 27, 28, 18, 21; 322/7, 8; 219/202

[56] References Cited

U.S. PATENT DOCUMENTS

| | | |
|---|---|---|
| Re. 26,327 | 12/1967 | Peaslee et al. . |
| Re. 26,630 | 7/1969 | Peaslee . |
| 2,026,474 | 12/1935 | Krantz ................................ 290/4 |
| 2,500,655 | 3/1950 | Bevins et al. ...................... 290/4 |
| 2,892,098 | 6/1959 | Bergvall ............................ 307/84 |
| 2,899,566 | 8/1959 | Ware et al. ....................... 307/73 |
| 2,967,252 | 1/1961 | Blake ................................ 307/151 |
| 3,274,482 | 9/1966 | Depenbrock . |
| 3,440,398 | 4/1969 | Nilssen ........................... 219/202 X |
| 3,585,485 | 6/1971 | Gyugyi et al. . |
| 3,641,418 | 2/1972 | Plette ............................. 307/151 X |
| 3,668,419 | 6/1972 | Cherry et al. ................... 307/84 X |
| 4,038,592 | 7/1977 | Stummer ......................... 363/165 |

Primary Examiner—James L. Dwyer
Attorney, Agent, or Firm—Louis L. Dachs

[57] ABSTRACT

The invention is a two-level power system for electrically powered aircraft sub-systems. An aircraft engine (2) drives a three phase generator (30) at a variable speed. The output of generator (30) is primary variable-voltage/variable-frequency (VV-VF) power which is utilized by various aircraft subsystems. A portion of the primary VV-VF power is converted to constant voltage-constant frequency (CV-CF) power by an inverter (31) which includes front end rectification. The CV-CF power is then available to selected aircraft subsystems while portions of the CV-CF power are converted by rectifier (32) and transformer-rectifier (33) into 270 vdc and 28 vdc power, respectively, which power is also then available to aircraft sub-systems.

13 Claims, 11 Drawing Figures

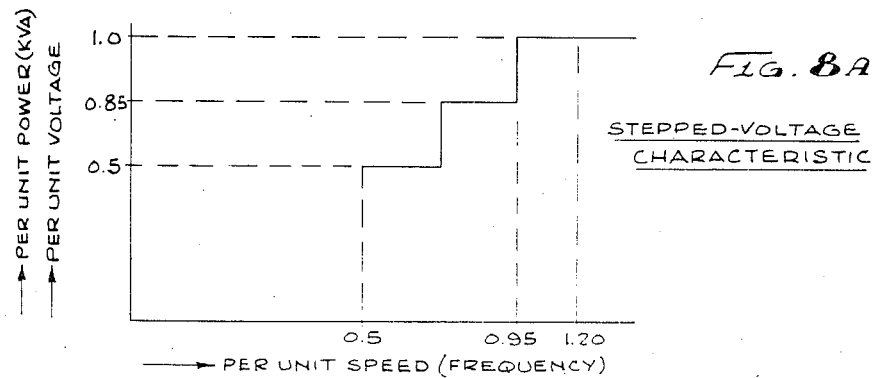
FIG. 8A
STEPPED-VOLTAGE CHARACTERISTIC
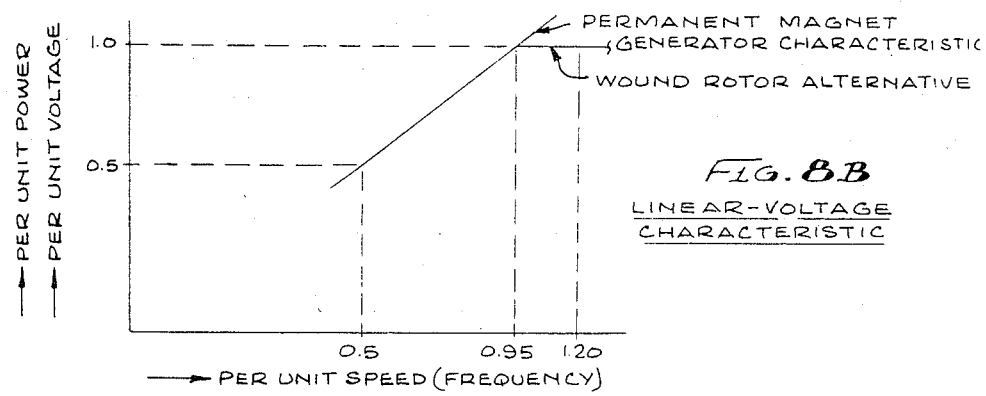
FIG. 8B
LINEAR-VOLTAGE CHARACTERISTIC
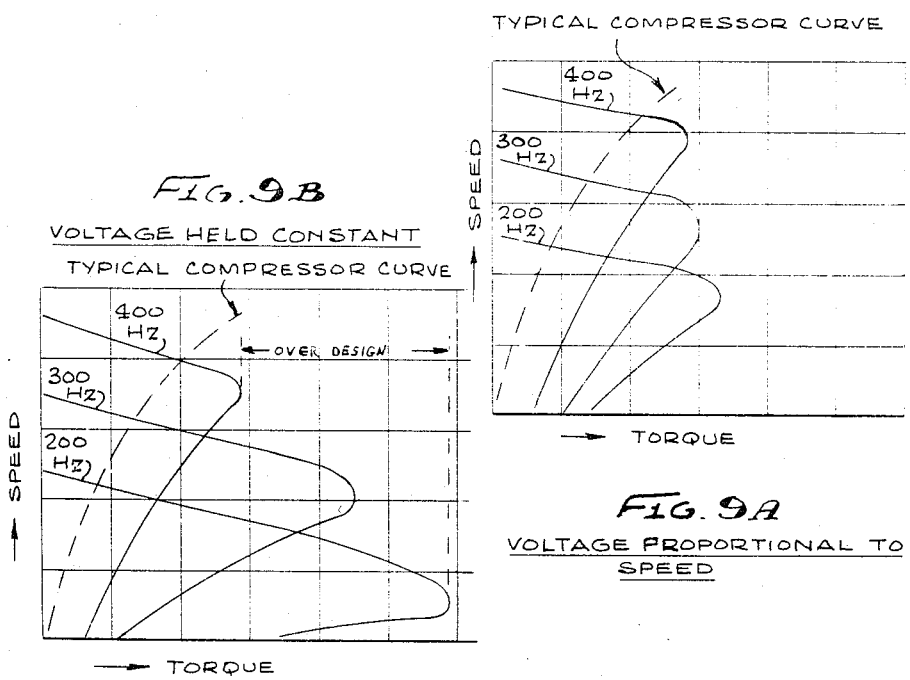
FIG. 9B
VOLTAGE HELD CONSTANT
FIG. 9A
VOLTAGE PROPORTIONAL TO SPEED

AIRCRAFT PROVIDING VARIABLE AND CONSTANT ELECTRIC POWER

TECHNICAL FIELD

The invention relates generally to advanced technology electric power generation in aircraft, and in particular, to an aircraft power system that provides two levels of power: (1) primary "unconditioned" and (2) secondary "conditioned." These two forms of electric power are used for various subsystems within an aircraft.

BACKGROUND ART

Aircraft generators are typically driven by variable-speed aircraft engines, such as for example by turbo-jet, turbo-fan, and prop-fan engines. In such systems the engine speed varies over the ground/flight envelope, which involves ground-taxiing, takeoff, cruise and landing phases of the aircraft. When the engine drives an electric-generator, the generator, turning at a variable speed, then puts out variable frequency power. Previous aircraft design, desiring a 100% conditioned constant frequency power output, typically used a 3-phase 400 Hz 200 VAC generator, driven by a constant speed drive (CSD) unit (interposed between the engine and the generator), or from an electronic converter system powered from a direct driven variable frequency generator.

One of the most widely used devices for providing 100% conditioned electric power has been the hydraulic CSD unit. This unit typically comprises a variable displacement hydraulic pump or a fixed displacement hydraulic motor that operates with a differential planetary gear system to maintain a constant rpm to the generator, over a requisite input speed range. The CSD unit which is placed between the engine variable speed drive and the generator, are mechanisms whose internal working parts are subjected to high hertz stresses, with consequent wear and heat dissipation problems. The service life and overhaul cycle of such systems are relatively short and considerable maintenance thereof is required. Finally, in addition to high production costs, the prospective higher-power limitations of these systems tend to inhibit the development of acceptable light weight systems. An example of a CSD type device mounted between an aircraft engine drive and a generator to provide ac current at a regulated frequency can be found in U.S. Pat. No. 2,500,655 to Bevins et al. A variation of this approach to constant power (100%) production is the "integrated drive generator" (IDG), which integrates the CSD and generator in one unit, thus requiring only a single mount and cooling interface with the dedicated cooling system, that must be provided for the CSD systems.

Another approach to providing constant-frequency power has been the use of advanced electric power system technology in systems known as VSCF (variable speed constant frequency) systems. Under such systems the generators are driven directly by the engines and are, therefore, subject to the engine speed variations. This results in generation of variable-frequency electric power which is then converted to constant-frequency electric power by static (electronic) power converters/inverters. These VSCF systems have typically used "cycloconverter", "dc link" or "270 VDC" technology.

The cycloconverter approach comprises a system for demodulating a lower frequency wave from a higher frequency wave and typically utilizes a static power converter, including a plurality of SCR devices. The lower synthesized ac wave is then passed through a filter to yield the constant frequency power desired, typically 400 Hz power. Such cycloconversion VSCF systems are depicted in U.S. Pat. No. 3,585,485 to Gywgyiand U.S. Pat. No. 3,141,418 to Plette. The power conditioning system in the '485 patent includes an improved firing angle control over the thyristor type converters and cycloconverters in the system. Yet another type of cycloconversion VSCF system is depicted in U.S. Pat. No. 4,038,592 to Stummer.

One problem with the cycloconversion VSCF system is that to generate the high quality 400 Hz power desired, the generator must turn at a high speed to produce a high enough frequency to be demodulated: this typically is three to four times higher than the 400 Hz power desired. This dictates the need for the frequency in the order of 1600 Hz at base speed. Since the range of an engine is usually 2:1 then if the generator develops 1600 Hz power at 50% speed, it will generate 3200 Hz at full speed. These high frequencies require high speeds of (typically) 10,000 to 20,000 rpm and a large number of (electrical) poles.

Another type of VSCF system is the "dc-link" power conditioning system. In this type of system variable frequency power supplied by a variable speed generator is rectified and inverted into constant frequency power for supply to aircraft electrically powered sub-systems. This type of approach is depicted in U.S. Pat. No. 2,892,098 to Bergvall, wherein power is conditioned into constant frequency ac and dc power. Under the system in the '098 patent, generators driven directly by the aircraft engines have a variable frequency alternating current output which will simultaneously supply direct current and constant frequency alternating current by utilizing a system of semiconductor rectifiers and static inverters.

Yet another type of VSCF power supply is a system which may be characterized as a 270 VDC system. In such a system a bridge rectifier is placed within the generator housing to rectify the 3-phase variable-frequency ac power to 270 VDC. Under this type of system it is necessary to invert a large percentage of the power for motor loads and for the large amount of 400 Hz equipment. This incurs significant weight disadvantage in some aircraft.

Other prior art approaches to VSCF systems for converting indeterminate variable engine shaft speed to a conditioned electrical output having a chosen value or range of determinate frequencies are exemplified in U.S. Pat. Nos. Re. 26,630 and Re. 26,327 to Peaslee, 2,899,566 to Ware et al, 2,967,252 to Blake, 3,274,482 to Depenbrook, and 3,641,418 to Plette. The problem common to all of the above VSCF electric power conversion systems is that 100% of the generator output is converted to constant frequency power, and as a result, these systems, like the CSD systems, are heavy and not weight-competitive with the system described herein. The conventional systems are also complex, costly and require a high level of maintenance activity. Additionally, the lower transmission efficiency and the thermal management problems, make the foregoing systems less acceptable.

A system utilizing multiple generators on a single shaft or on shafts driven by a single power source is shown in U.S. Pat. No. 2,026,474 to Kranz. The '474 patent describes a turbine-generator system adapted to meet fluctuating electric arc furnace loads. The system utilizes two or more generators having the rotors thereof driven by counterflow turbine shafts and includes means, including a dc exciter connected in series with the field windings of the generators, to maintain the ratio of the power outputs of the separate generators substantially constant.

All of the prior art systems discussed hereinabove, incorporated by reference herein, involve power systems which are of less than optimum design when used in aircraft power supply systems: particularly those of large capacity. It is a primary object of the present invention to provide an aircraft electrical power system which is optimized in terms of minimizing weight, complexity and cost, which provides only the amount of conditioned secondary power, required by certain aircraft electrical sub-systems, while simultaneously providing primary unconditioned electric power to the remaining electrically powered sub-systems. This described system is also particularly appropriate to future aircraft, where the electric power demands of loads, such as the ECS (environmental control systems), may be very large.

SUMMARY OF INVENTION

The invention relates to an advanced technology electric power generation system for use in aircraft. the system provides two levels of electric power: (1) primary "unconditioned"; and (2) secondary "conditioned" power. Both forms of power are generated by driving at least one generator directly by the aircraft's engines without interpositioning constant speed drive-type devices.

In a first form of the invention, a three-phase generator is driven by an aircraft engine at variable speed. The generator output is thus variable-voltage/variable-frequency (VV-VF) power. This primary VV-VF power is utilized by several aircraft subsystems, while a portion thereof is converted to secondary constant voltage/constant-frequency power which is then utilized by other aircraft subsystems or conditioned further for use by such subsystems.

In a second form of the invention, two generators, namely, major and minor generators, are driven by an aircraft engine, the primary VV-VF power being generated by the major generator while the secondary conditioned power is generated by the minor generator.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

BRIEF DESCRIPTION OF DRAWINGS

FIGS. 8A and 8B are graphs showing the generator voltage varying as a function of engine speed (generator-frequency) in stepped or linear fashion; and FIGS. 9A and 9B are induction motor voltage-profile graphs for voltage proportional to speed and voltage held constant situations respectively.

BEST MODE FOR CARRYING OUT THE INVENTION

The purpose of the present invention is to provide two levels of electric power, over the complete speed range; one constant and one variable. The generator supplying this power to the sub-systems and devices in aircraft, results in a generator, whose size, capacity and the weight are significantly reduced.

Figure 1:
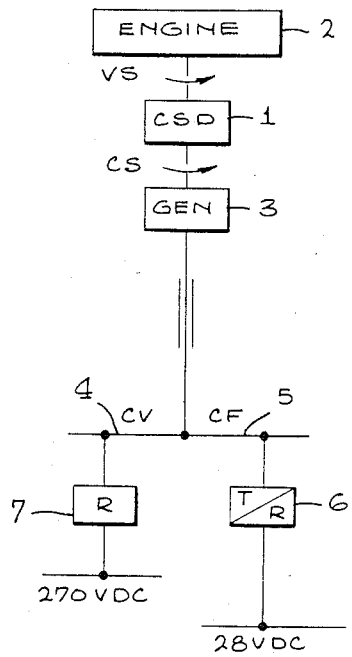
FIG. 1 is a schematic representation of a prior art aircraft electrical power supply system showing a constant-speed-drive interposed between the aircraft engine and generator.

In assisting one to understand the generator sizing problems associated with aircraft it is helpful to realize that if a generator, must provide, for example, at least 120 kva from 50% to 100% engine speed, it is electromagnetically capable of producing 240 kva at 100% speed. Therefore, throughout the take-off, climb and cruise segments of the airplane (high engine speeds), the generators are in effect about 100 percent oversized. It is a basic object of the present invention to utilize and develop an optimally sized power system that provides the desired power to aircraft systems from 100% (1 per unit, 1 PU) speed down to about 50% power at 0.5 PU speed; i.e., a "power proportional-to-speed". Such a system requires that each generator develop a voltage that varies with speed, as will be described in accordance with the present invention. Referring now to the drawings wherein like numerals denote like parts, FIG. 1 schematically indicates a CSD driven generator 3. The constant speed drive (CSD) unit 1 is interposed between the engine 2 and the three phase generator 3. The variable speed drive of the engine 2, (indicated by arrow VS), is converted via CSD unit 1 to a constant speed drive, (indicated by arrow CS), delivered to the generator 3. Under this type of system, constant voltage (CV) and constant frequency (CF) power is delivered to the aircraft electrical sub-systems via the lines 4 and 5.

Typically, in aircraft, 200 V/400 Hz ac power is generated with a portion of such power being rectified to 28 VDC. In the system of FIG. 1, the generator is driven at constant speed, therefore, it is a constant-voltage constant frequency, constant-power, system. As shown, some of this power is conditioned to 28 VDC via a transformer-rectifier 6; also, a portion of the power is rectified, via a three-phase full-wave bridge-rectifier 7 to produce 270 VDC power. Thus, when it is desired to convert 200 V/400 Hz CV-CF ac power to 270 VDC, the CV-CF power is rectified with a three phase full wave bridge rectifier without a transformer. It is projected, in modern aircraft using all electric flight controls, that 270 VDC will be the power-source for the inverter that will supply synthesized ac power for the flight control motors. Thus, in the FIG. 1 prior art CSD power system, CV-CF primary power is produced and portions thereof are then converted to 270 VDC and 28 VDC power, as desired.

Figure 2:
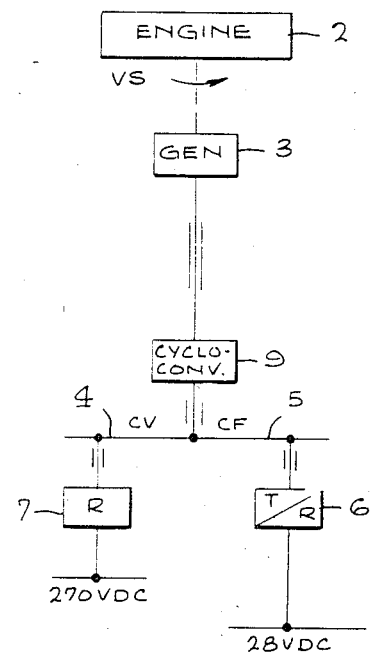
FIG. 2 is a schematic representation of a prior art variable speed constant frequecy (VSCF) aircraft power system of the cycloconverter type.

FIG. 2 is a schematic representation of one form of prior art VSCF system frequently referred to as a "cycloconverter" power system. In this system, the high frequency power put out by the generator 3 is synthesized into 200 V/400 Hz power by processing through a cycloconverter 9 which includes a plurality of SCR's (silicon controlled rectifiers) and a filter. Like the CSD, 100% 200 V/400 Hz CV-CF primary power is produced and this may then be processed, as described hereinabove, to produce 270 VDC and 28 VDC power as desired.

Figure 3:
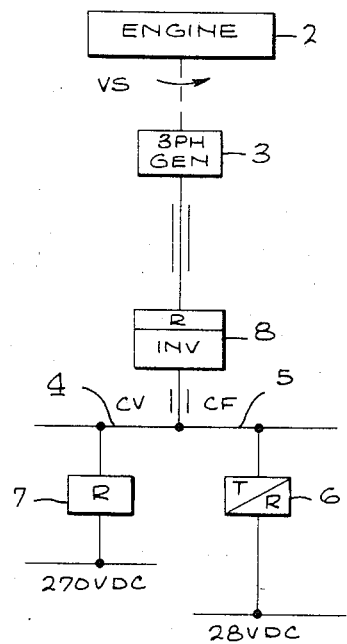
FIG. 3 is a schematic representation of a prior art VSCF aircraft power system of the dc link type.

A third type of prior art VSCF system known as "dc-Link" is shown in FIG. 3. In this particular prior art embodiment, 100% of the power output of generator 3 is rectified and inverted via a rectifier-inverter device 8 into the CV-CF primary power. Again, the desired 270 VDC and 28 VDC power can be produced as described with reference to FIGS. 1 and 2.

Figure 4:
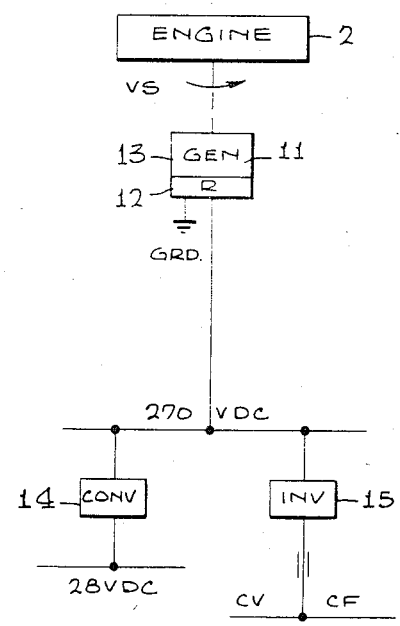
FIG. 4 is a schematic representation of a prior art VSCF aircraft power system of the 270 VDC type.

Yet another prior art VSCF system known as "270 VDC" is depicted in FIG. 4. In this prior art approach, a three phase generator 11 and a regulating three phase bridge rectifier 12 are placed in a single housing 13 to develop 100% 270 VDC power. In this circumstance, in order to produce 28 VDC power the 270 VDC primary power is converted through a static switching regulator, converter 14, to 28 VDC. To get 200 V/400 Hz CV-CF power the 270 VDC primary power must be inverted via the inverter 15. This type of power is required in current and near future planes, since a great deal of the equipment, in inventory, is rated for 400 Hz 200 VAC power.

It is to be noted that in all the above conventional electric power systems, the generator voltage is "regulated" to generate the "constant-power" characteristics at the bus.

In the aforementioned VSCF "electrical" approaches to providing constant-frequency power, the generators and converters are typically oversized and overweight. In addition, the larger converters have heat rejection problems and they utilize electro-thermally sensitive solid state devices; also, there are problems in obtaining high-current high-voltage static switching elements for large capacity systems. The CSD systems, on the other hand, have a history of low mean time between failures, poor reliability and high life-cycle costs.

When it is necessary for a generator to cope with variations in engine speed, the generator size/weight ratio is high because it must provide a constant power at the base speed. Thus, the lower the base speed, the bigger the generator. However, when the primary power supplied to aircraft electrical sub-systems has variable voltage-variable frequency (VV-VF) characteristic, as described herein, the generator becomes optimally designed in terms of weight and size. Secondary or conditioned power in this system is then provided by separate means, as will be described hereinbelow, but only in amounts needed. Such a "two-power level generating system" could then be optimally designed to reduce weight penalty, while covering the speed range typically encountered in aircraft engines.

Figure 5:
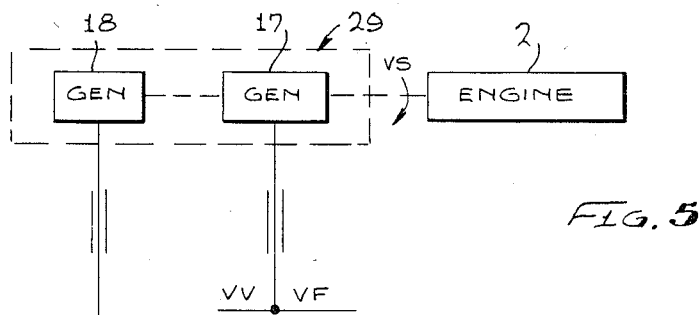
FIG. 5 is a schematic representation of a partial-power conversion system in accordance with a first embodiment of the present invention.

One embodiment of aircraft power generation utilizing a two-level power conversion system in accordance with the present invention is shown by reference to FIG. 5. In order to avoid having to pay a severe weight penalty with a large generator providing "constant-power" over the speed range, a second small (minor) generator is used to supply the typically small demand for constant-power. The primary (first level) VV-VF power is generated via a first major generator 17, while secondary (second level) CV-VF power is generated via a second voltage-regulated generator 18. As an example, for an "all electric" aircraft, generator 17 might be a 300 kva generator, and instead of having to size it equivalent to 600 kva, for a 2:1 engine speed ratio, a smaller generator 18, say of 15 to 30 kva capacity is utilized to provide the amount of constant (constant voltage) conditioned power required.

The output of the minor generator 18 is therefore constant voltage (CV-VF) power, which can be rectified, via the three phase 200 V bridge rectifier 19, to provide 270 VDC (conditioned) power. In addition, this secondary CV-VF conditioned power can be rectified via a rectifier 21 and changed into CV-CF 200 V/400 Hz ac power, (via inverter 22): the CV-CF power can then be partially converted to 28 VDC via a conventional T/R unit. Thus, a two-level power system is provided where various types of power may be generated, such as primary VV-VF power, as well as conditioned secondary power, such as CV-VF, constant level 270 VDC, CV-CF, and 28 VDC power. This avoids the weight penalty incident on a single large generator or system that must provide constant (conditioned) power over the generator (engine) speed range. In the FIG. 5 embodiment, it is evident that the weight penalty, normally associated with the aircraft engine speed range, is now relegated only to the smaller or "minor" generator 18. In essence, the only power being conditioned is the typically smaller amount of power, while the primary (unconditioned) VV-VF power is fully utilizable by various aircraft electrical sub-systems, as will be further explained hereinbelow.

Figure 6:
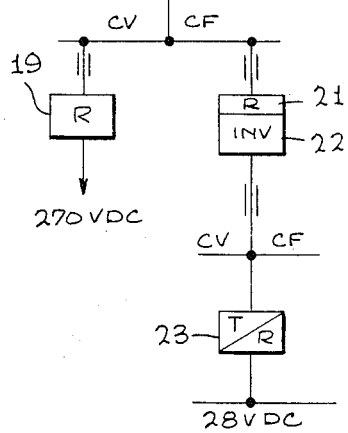
FIG. 6 is a schematic representation of a partial-power conversion system in accordance with a second embodiment of the present invention.

The embodiment of FIG. 6 shows another multiple generator configuration where, as in FIG. 5, a "major" generator 17 provides primary VV-VF power while a constant level of 270 VDC power is generated by the "minor" generator 24 over the speed range. However, the minor generator 24 now includes a three-phase bridge rectifier 25 such that conditioned 270 VDC secondary power is provided by this machine. This conditioned 270 VDC power can then, if desired, be inverted via an inverter 27 from 270 VDC to CV-CF 200 V/400 Hz ac power, which in turn, can be transformed and rectified by a transformer-rectifier 28 into 28 VDC power, as desired.

It is evident and it should be understood that as an alternative to the use of two distinct generator units, two differently power-rated ac generator sections might be placed in a single housing (indicated by dotted line 29), to form a "hybrid" generator with two different power-rated sections.

Figure 7:
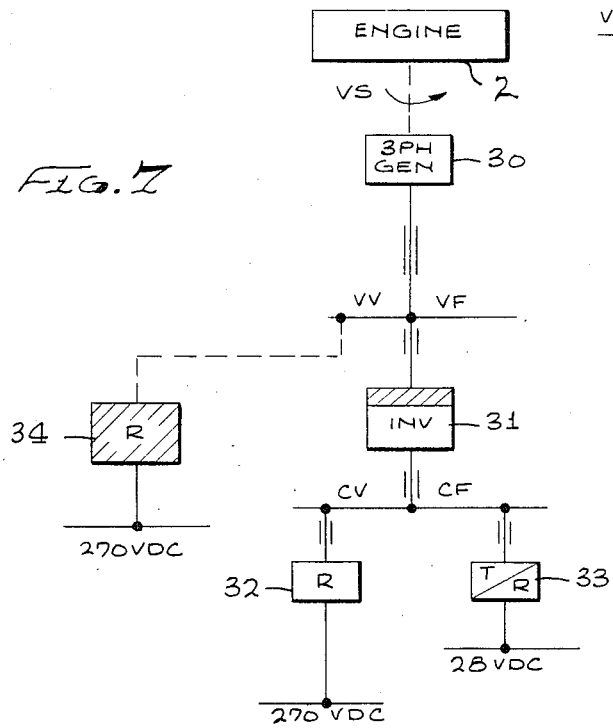
FIG. 7 is a schematic representation of a partial-power conversion system in accordance with a third embodiment of the present invention.

An alternative, preferred, embodiment of the partial power generation system of the present invention is shown in FIG. 7. In this embodiment, a three phase generator 30 is driven by the engine 2 at a variable speed (indicated now by VS). The generator produces primary VV-VF power, and only a small portion of this is conditioned by an inverter 31 which includes "front-end voltage-control." The inverter 31 includes front-end rectification using phased-delayed SCR's (silicon controlled rectifiers), pulse-width-modulation techniques, or other means well known in the art to regulate the input voltage to the inverter to 270 VDC. In this embodiment therefore, a conventional-type ac generator, with a speed-(frequency) characterized voltage is utilized directly for the major loads, of various aircraft electric power sub-systems, while the balance of the power output of generator 30 is converted, via the inverter 31, to constant-power (constant-voltage/constant-frequency power).

The 200 V/400 Hz CV-CF power output of inverter 31 may then be rectified by a three-phase 200 V bridge rectifier 32 to 270 VDC power, or may be conditioned by a transformer/rectifier 33 into 28 VDC power. As an alternative embodiment, a regulated 3-phase rectifier bridge 34 may be utilized to rectify the variable voltage/variable frequency output of generator 30 to produce 270 VDC power.

The front end of static inverter 31 may consist of a bridge-rectifier, using gate-controlled SCR's, (or other voltage modulation method) in the positive (or all) legs of the bridge. The gate-firing logic may then be programmed as a function of the input voltage in such a way that at maximum and normal speeds, the SCR's are phase-delayed to compensate for the higher generator voltage at that time. With this type of control, the input to the static inverter 31 is maintained at approximately constant voltage over the generator speed and load range.

Under the "two level" system depicted in FIG. 7, the standard three phase generator 30 is optimally-designed, and the majority of the VV-VF ac power produced is utilized directly by various electrical sub-systems in the aircraft, as will be further detailed hereinbelow. It is of significant note also that the permanent magnet (samarium-cobalt) generator, inherently, produces the desired voltage-proportional-to-speed characteristic.

There has been a generally accepted premise in the aircraft industry that conditioned power, that is, constant-frequency power/constant-voltage power, is necessary in aircraft. It is interesting to note however, that having constant-frequency power is often a disadvantage with certain electrically powered devices and sub-systems. For example, fuel pumps driven by electric motors that operate under a constant frequency system run at constant speed, and therefore displace the same amount of fluid at all times. However, when an aircraft is coming in for landing and the engines are throttled back to idle-descent power settings, there is a corresponding large drop in fuel demand. In this situation, it becomes necessary to bypass the extra fuel supplied and pump it in a re-circulation mode. The power characteristic is also ideal for the operation of electro-hydraulic pumps, since pumps, which are normally engine-driven, are already adapted to the speed range. The pump has constant pressure but the flow (displacement) is proportional to speed: in other words, in all rotary devices that are subject to speed variations, the power is some function of the rotational speed. This natural law, however, is broken when a constant level of electric power is generated over the ground/flight operating speed range of the engines. Utilization and design then, of these devices, frequently becomes less than optimum in a "constant-power" mode of operation.

When a motor is operating on variable frequency ac current, if the voltage does not go down when the frequency goes down, the motor may burn out, or draw so much current as to pop the motor's circuit-breakers. Thus, there is synergism when the voltage drops with frequency, since it is an ideal characteristic for ac induction motors. Therefore, in this system the motors are minimally sized and they operate essentially as constant-torque/variable speed motor over any wide frequency (speed) range. This means that any device, such as fuel and hydraulic pumps, which may normally be driven by the engine, can be equally-well driven by an ac motor, working in a variable-frequency power system. The pump can thus be driven by an electric motor and act just as if it were mounted on the engine. Of course, when utilizing an electric motor, the situation is considerably enhanced by the fact that the pump is isolated from the hostile environment of the engine. In addition, the motors provide a torsional-free drive for the pumps, thereby improving their reliability and service life.

Another example of an aircraft service, which uses large amounts of power during flight, but little during landing, is the electric-galley. Typically, during the descent and landing mode, there is no cooking, etc. required and thus there is little or no galley power demand. These examples show there is no real need, for constant-voltage/constant-frequency power for loads, such as this. Also, it becomes clear that certain electrically powered sub-systems for aircraft may not only be operable from VV-VF power, but they can, in fact, be more optimally designed, for such a form of power. A two-level-power generation system then, as defined by the instant invention, and as shown in the embodiments of FIGS. 5 thru 7, is fully utilizable and many electrically-operated loads and devices may operate synergistically with this power generation system. Typically, for instance, windshield and electric de-icing loads would benefit by low voltage on the ground, when there is little or no aerodynamic cooling.

To clarify further the meaning and significance of providing a VV-VF primary power source, reference is made to FIGS. 8A and 8B. FIGS. 8A and 8B are alternative generator-voltage characteristics, when the voltage is varied as a function of the engine speed. In the FIG. 8A plot, the generator voltage is held constant from about 95% to 112% frequency (where the 1 PU frequency could be 400, 600, 800 Hz or higher) during normal flight conditions, but at idle-descent let-down (on approach, when the engine speeds are lower), the voltage could be reduced in steps (as in FIG. 8A): alternatively, it could be reduced linearly, as shown in FIG. 8B. Of the two approaches, FIG. 8A may be simpler (with a wound rotor generator), but FIG. 8B is preferred, since it provides a better characteristic for ac motors; and it minimizes voltage-transients, incident on step-voltage changes. The importance of the FIGS. 8A and 8B voltage control is that all conventional ac induction motors are designed for some per unit voltage-to-frequency ratio. If the voltage were maintained constant below 0.95 PU frequency (i.e., 380 Hz in the conventional ac systems), the iron would saturate and excessive magnetizing current would be drawn by the motor. This would cause the motor circuit breakers to trip, or the motor would burn out. The characterized voltage-profile, therefore, prevents this possiblity and it is ideal for the ac motors, since it gives the motors a constant-flux/constant-torque characteristic (see FIG. 9A). As noted in FIG. 8B, a permanent magnet generator inherently provides a voltage proportional to speed characteristics, without any special voltage regulation method.

Referring to FIGS. 9A and 9B, induction motor torque-speed characteristics at various frequencies are plotted for (1) the voltage-proportional-to-speed situation, in accordance with the primary power system of the present invention (FIG. 9A); and for (2) the voltage held constant over the speed range of prior art power systems (FIG. 9B). A typical ECS compressor curve is also plotted on FIGS. 9A and 9B. A review of these figures indicates that variable-voltage, primary-power is actually ideal, and in essence yields a synergistic result: it also improves the efficiency and weight considerations discussed hereinbefore. FIG. 9A shows that when the speed is cut back, in the descent mode, the torque-requirements of a typical compressor motor are well within the motor's torque-capability while, FIG. 9B, shows (at 200 Hz/constant voltage for example) that the overdesigned-motor develops significantly more torque than the load demands.

It is a matter of record and fact that there will probably always be a need for a certain amount of conditioned power. For example, solenoids, control valves, shut-off valves, indicators/lamps, rotary actuators, instruments, etc. are typically designed for 28 VDC power. Also typical aircraft avionics systems require constant voltage/constant frequency power. However, the larger power requirement systems, such as environment control systems (ECS), can utilize motor driven compressors operating from the VV/VF system. Also, galley loads, wing/propellor deicing systems, heating, landing gear, etc., can also be readily operable, or adaptable, to the variable frequency-variable voltage power. To calibrate the reader, the amount of secondary or conditioned power might be typically 15% of the total electric power generated, and most probably would not exceed 25% of the total power generated. This becomes especially so, when the larger commercial aircraft are considered, since the requirement for conditioned power remains rather consistent, while the requirement for primary unconditioned power, for ECS systems, galleys and the like systems, increases greatly as the overall size and thus aircraft load capacity increases.

The foregoing primary power conversion system thus provides a compatible voltage/frequency characteristic for present motors and equipment. The "minor" generator in FIGS. 5 and 6 provides the small amount of constant-frequency, or constant voltage (270 VDC) power over the 2:1 speed range. To this extent, the oversizing penalty only affects these smaller machines, so the weight penalty is small, compared to designing a large generator for the speed range.

One of the advantages of the system of FIG. 6 over that of FIG. 5 is that 270 VDC can be obtained simply by using a three-phase bridge rectifier (in the generator) in which voltage regulation is accomplished by gate-control of three SCR's, in the positive legs of the rectifier. There are advantages and other trades that can be made, but these are not within the scope or purpose of this disclosure.

The above description has related to generators that may be construed as "wound-rotor" or "permanent-magnet" machines. It will be evident to those familiar with the state of the art (in aircraft type advanced power generation systems) that the main machine, in the dual or single generator configuration, could utilize a samarium cobalt (Sm $CO_5$) rotor. This generator would have an inherent constant E/F ratio, since the voltage would be directly proportional to engine speed.

In accordance with the present invention a unique "two-level (two type)" power system has been described which utilizes a "minor" and "major" generator, either operated singly or in one housing, or which utilizes a converter to change a portion of a generator's output to constant frequency (or constant-voltage dc) power. The converter utilizes variable-voltage tolerant circuitry in the front-end of the inverter. The key lies in the optimum designing of the "major" generator; this is the generator whose kva output is variable and proportional to speed input.

It is a further matter of record that for a greater part of an aircraft's operating profile, the engines (and the frequency of the generators) is relatively constant, so the primary power voltage/frequency is constant and comparable to a CV/CF system. In the idle descent let-down flight mode, as described, only a small percentage of power is kept constant down to the lower speed range, and this is acceptable because the demand for constant-frequency (or constant power) is usually small in most commercial and military aircraft. Space, weight, cost and thermal management problems are thereby reduced, by tailoring the minor generator or converter to the special constant-frequency requirements of the special loads demanding it.

In addition, consideration of a 400 V/800 Hz generator system has the unique advantages that on the ground, at the usual 0.5 PU engine speed, the system becomes a conventional 200 V/400 Hz system, so it is compatible with 400 Hz external power. Also, the trend to much higher rotating machinery speeds, permits synchronous speeds up to 48,000 rpm (compared to the previous 24,000 rpm at 400 Hz). Finally, another advantage of the suggested voltage/frequency ratio is that the magnetic-iron of many existing motors (and transformers) can be adapted to the higher PU frequencies, without modification or design changes. Yet another is the fact that at the 50% speed condition, the rectification of the 3-phase 200 VAC (400 Hz) power yields 270 VDC. As yet another advantage, rectified 3-phase 60 Hz 200 VAC power can be used to power the 270 VDC inverters, if a 270 VDC terminal tap were provided on device 31 (FIG. 7).

While the aircraft partial power conversion system of the present invention has been described with reference to particular embodiments, it should be understood that such embodiments are merely illustrative as there are numerous variations and modifications which may be made by those skilled in the art.

Industrial Applicability

The two-level power conversion system, utilizing primary variable-voltage/variable frequency power and secondary constant-frequency (or constant voltage power), is suitable and readily adaptable to power aircraft sub-systems.

I claim:

1. In an aircraft having at least one variable speed engine first electricity driven subsystems and devices including fuel pumps, electrohydraulic pumps, electric-galley, de-icing, and environmental control subsystems, and second electrically driven subsystems and devices including solenoids, control valves, shut-off valves, indicators, lamps and instruments, the improvement comprising:

generator means associated with and adapted to be driven by said at least one aircraft engine continuously and at variable speeds, said generator means being further adapted for generating primary variable-voltage/variable-frequency power to said first electrically driven subsystems and devices; and means associated with said primary power generating means for converting a minor portion of said primary variable-voltage/variable-frequency power to conditioned secondary power for said second electrically driven subsystems and devices.

2. An aircraft in claim 1 wherein said generating means comprises a three phase generator.

3. An aircraft as in claim 1 wherein said means associated with said primary power generating means converts at least a portion of said primary variable-frequency/variable-voltage power to constant-voltage/constant-frequency power.

4. An aircraft as in claim 3 wherein said means for converting to constant-voltage/constant-frequency power comprises an inverter with front end voltage control circuitry.

5. An aircraft as in claim 3 including means for converting at least a portion of said constant-voltage/constant-frequency power to a constant level of 270 volt dc power.

6. An aircraft as in claim 5 wherein said means for converting to 270 volt dc power includes a three phase bridge rectifier.

7. An aircraft as in claim 3 wherein said means associated with said primary power generating means converts at least a portion of said primary variable-frequency/variable-voltage power to a constant level of 270 volt dc power.

8. An aircraft as in claim 7 wherein said means for converting to said constant level of 270 volt dc power includes a three phase rectifier bridge, said rectifier bridge including voltage-control means connected to the variable-voltage/variable frequency power.

9. An aircraft as in claims 3, or 26 including means for converting at least a portion of said constant-voltage/constant-frequency power to 28 volt dc power.

10. An aircraft as in claim 9 wherein said means for converting to 28 volt dc power includes a transformer-rectifier device.

11. An aircraft as in any of claims 1, 3, or 5 wherein said means for generating primary variable-frequency/variable-voltage power comprises a permanent magnet rotor generator.

12. An aircraft as in claim 11 wherein said generator includes a high energy permanent magnet rotor.

13. An aircraft as in claim 12 wherein said high energy permanent magnet rotor comprises a samarium cobalt rotor.

* * * * *